UNITED STATES PATENT OFFICE.

OSCAR NASTVOGEL, OF ELBERFELD, GERMANY, ASSIGNOR TO THE FARBENFABRIKEN OF ELBERFELD COMPANY, OF NEW YORK.

BLUE DIPHENYLNAPHTHYLMETHANE DYE AND PROCESS OF MAKING SAME.

SPECIFICATION forming part of Letters Patent No. 658,504, dated September 25, 1900.

Application filed October 4, 1899. Serial No. 732,551. (Specimens.)

*To all whom it may concern:*

Be it known that I, OSCAR NASTVOGEL, doctor of philosophy, chemist, (assignor to the FARBENFABRIKEN OF ELBERFELD COMPANY, of New York,) residing at Elberfeld, Germany, have invented a new and useful Improvement in Blue Diphenylnaphthylmethane Dye; and I hereby declare the following to be a clear and exact description of my invention.

In the specification to British Letters Patent No. 23,392, of 1893, the production of blue basic dyestuffs has been described, which have most probably the general formula:

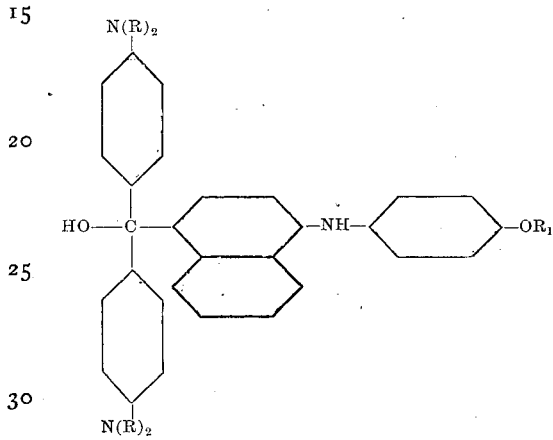

(R and $R_1$, meaning either the same or different fatty alkyl radicles—such as methyl, ethyl, or the like)—and which can be obtained, for instance, by condensing tetraalkylated diamidobenzophenones with para-alkyloxyphenyl-alphanaphthylamins in the presence of phosphorus oxy chlorid. I have now succeeded in finding that by treating the said basic dyestuffs with sulfonating agents very valuable pure blue coloring-matters are obtained, which dye unmordanted wool in acid-baths very clear and even shades fast to alkalies.

In carrying out my new process practically I can proceed as follows, the parts being by weight: Twenty parts of the dyestuff obtainable by condensing tetramethyl-diamidobenzophenone with para-ethoxyphenyl-alphanaphthylamin in the presence of phosphorus oxychlorid are carefully dried and pulverized and then stirred into one hundred and sixty parts of fuming sulfuric acid (containing thirteen per cent. of $SO_3$) the temperature being kept between zero and 10° centigrade. Stirring is continued at ordinary temperature until a diluted test portion of the reaction mixture is found to be soluble in ammonia. When this stage is reached, the reaction liquid is poured on ice. The resulting mixture is heated to about 50° to 60° centigrade and then neutralized with sodium carbonate, by means of which operation at the same time the sodium salt of the new sulfonic acid is separated in the shape of a resinous precipitate, which soon transforms into a crystalline mass. The new dyestuff thus obtained is isolated by filtration. If necessary, it can be further purified by dissolving the same in hot water and again precipitating from the resulting solution by the addition of common salt.

The new coloring-matter represents when dry and pulverized a brown powder having a bronze-like luster. It is easily soluble in water and soluble in alcohol, with a blue color. By a twenty-eight-per-cent. hydrochloric acid it is dissolved with a reddish-brown color. In concentrated sulfuric acid (66° Baumé) it dissolves with a brownish-red color, which changes into green on the addition of a small quantity of ice, while the color is changed into blue on the addition of a larger quantity of ice, a blue flaky precipitate being at the same time separated.

The new dyestuff yields on wool in acid-baths beautiful blue, clear, and even shades.

Very similar results are obtained if other of the above-defined basic dyestuffs are employed in the foregoing example.

Having now described my invention and in what manner the same is to be performed, what I claim as new, and desire to secure by Letters Patent, is—

1. The process for producing new diphenylnaphthylmethane dyestuffs which process consists in first acting with fuming sulfuric acid on basic dyestuffs of the probable formula:

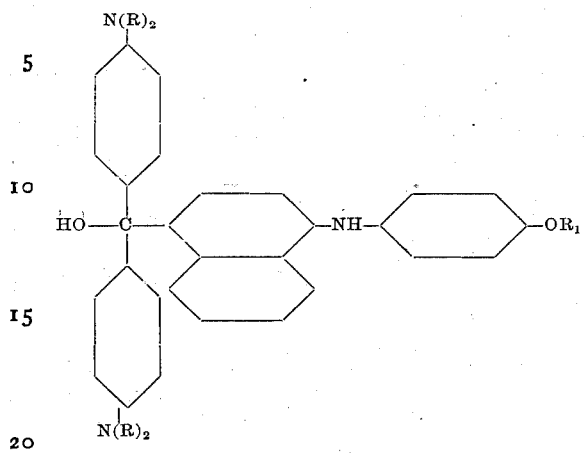

R and R₁ meaning fatty alkyl radicals, and secondly isolating the dyestuff sulfonic acids thus produced in the form of their alkaline salts, substantially as hereinbefore described.

2. The process for producing a new diphenylnaphthylmethane dyestuff which process consists in first acting with fuming sulfuric acid on the basic dyestuff of the probable formula:

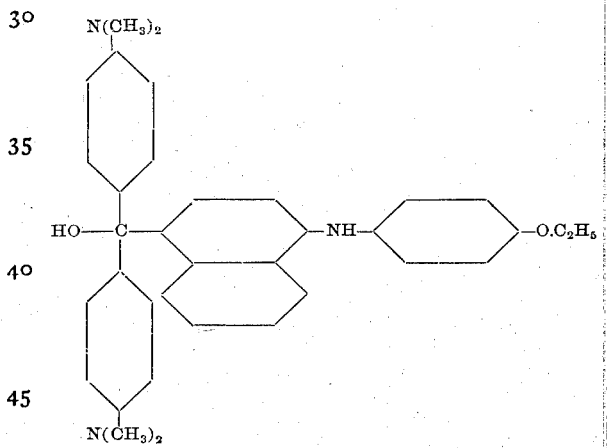

and secondly isolating the dyestuff sulfonic acid thus obtained in the form of an alkaline salt, substantially as hereinbefore described.

3. The herein-described new dyestuffs of the diphenylnaphthylmethane series being when dry and pulverized brown powders of a bronze-like luster, soluble in water and in alcohol with a blue color, in a twenty-eight-per-cent. hydrochloric acid with a reddish-brown color being dissolved by concentrated sulfuric acid with a brownish-red color, dyeing wool in acid-baths blue shades, substantially as hereinbefore described.

4. The herein-described new dyestuff of the diphenylnaphthylmethane series obtained from the basic coloring-matter of the probable formula:

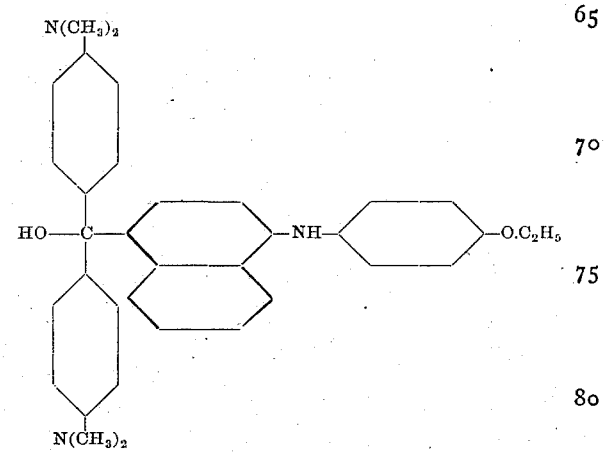

being when dry and pulverized a brown powder of a bronze-like luster, soluble in water and in alcohol with a blue color, in a twenty-eight-per-cent. hydrochloric acid with a reddish-brown color, being dissolved by concentrated sulfuric acid with a brownish-red color which changes into green on the addition of a small quantity of ice while the color is changed into blue on the addition of a larger quantity of ice a blue flaky precipitate being at the same time separated, dyeing wool in acid-baths beautiful blue, clear and even shades, substantially as hereinbefore described.

In testimony whereof I have signed my name in the presence of two subscribing witnesses.

OSCAR NASTVOGEL.

Witnesses:
R. E. JAHN,
OTTO KÖNIG.